United States Patent Office 3,655,809
Patented Apr. 11, 1972

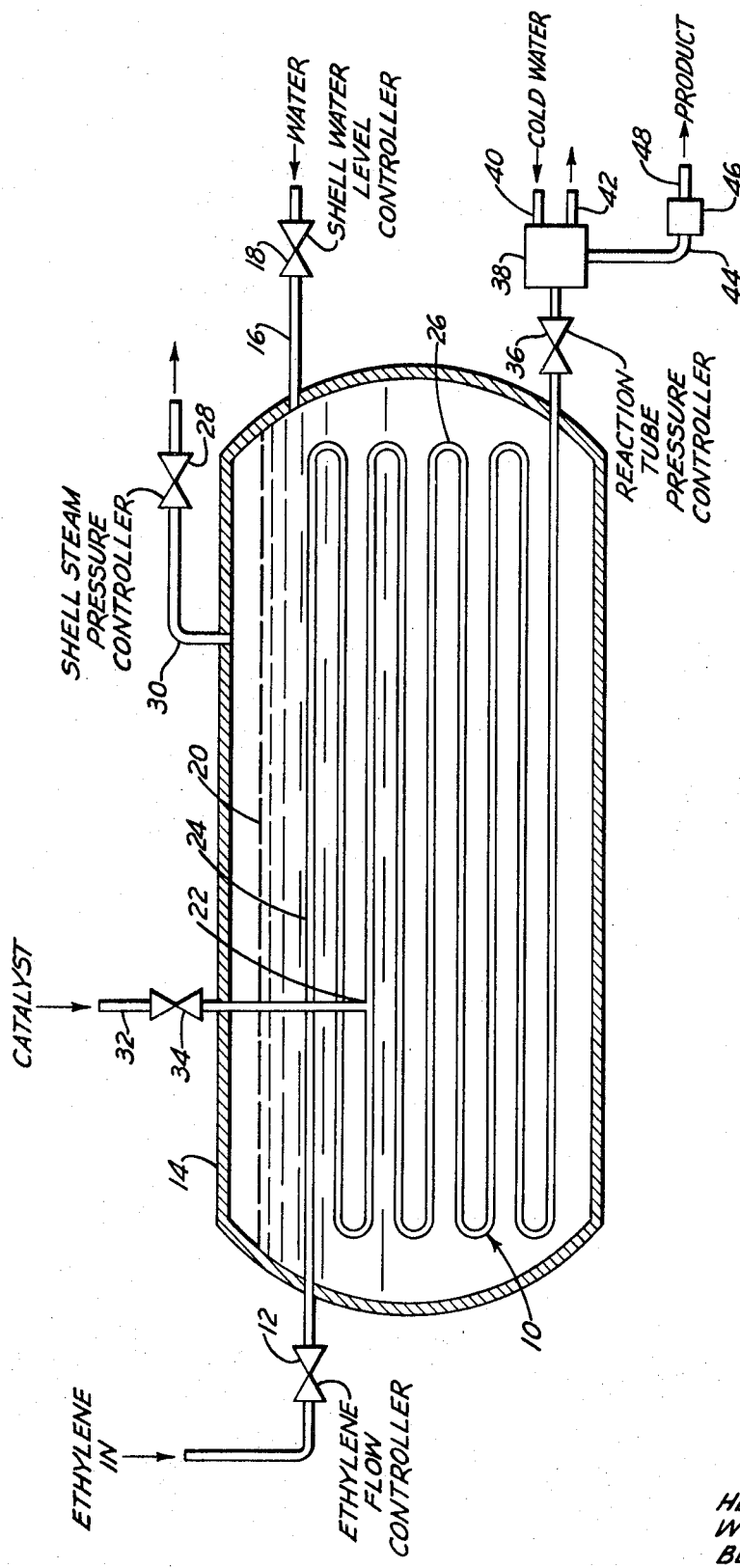

3,655,809
CONVERSION OF ETHYLENE TO ALPHA OLEFINS IN THE PRESENCE OF A DIISOBUTYLENE SOLVENT
Herbert B. Fernald and William Gall, Glenshaw, Bernard H. Gwynn, Gibsonia, and John V. Ward, Oakmont, Pa., assignors to Gulf Research & Development Company, Pittsburgh, Pa.
Filed Mar. 17, 1970, Ser. No. 20,355
Int. Cl. C07c 3/10
U.S. Cl. 260—683.15 D          5 Claims

ABSTRACT OF THE DISCLOSURE

Alpha olefins are produced from ethylene in the presence of an organometallic catalyst, such as triethylaluminum, dissolved in diisobutylene. Diisobutylene is easily separated from the desired alpha olefin products and its presence increases catalyst and reactor efficiencies.

---

This invention relates to a process for the production of alpha olefins from preheated ethylene in the presence of a solvent. More particularly, this invention relates to a process for the production of alpha olefins from ethylene within a long tubular reactor with ethylene being charged to one end of the reactor coil and an organometallic catalyst dissolved in a solvent of this invention being charged to said coil, preferably, at an intermediate position along the length thereof, whereat said ethylene has been preheated.

The step-wise conversion of gaseous ethylene to higher straight chain normally liquid olefins having the double bond in the terminal or alpha position proceeds as follows:

$$CH_2=CH_2+CH_2=CH_2 \rightarrow CH_3—CH_2—CH=CH_2$$
$$CH_3—CH_2—CH=CH_2+CH_2=CH_2 \rightarrow$$
$$CH_3—CH_2—CH_2—CH_2—CH=CH_2$$

etc. This polmerization occurs catalytically in the presence of organometallic compounds, such as aluminum alkyls, which participate in the reaction. As the reaction proceeds in the presence of excess ethylene, an increasing quantity of gaseous ethylene is converted to liquid olefin so that the density of the reaction system progressively increases. The chemistry of the alpha olefin process can be described in terms of three major reactions. In the propagation (growth) reaction, an alkyl group on an aluminum atom containing $n$ ethylene units can add an ethylene molecule to become an alkyl group of $n+1$ ethylene units, as follows:

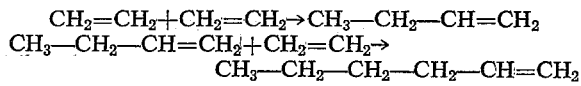

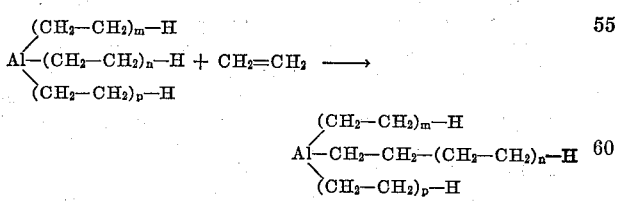

The transalkylation (displacement) reaction which occurs concurrently with the growth reaction consists of two steps. These are, first, thermal decomposition of an aluminum alkyl group to a hydride plus alpha olefin followed by a rapid reaction of the hydride with ethylene to regenerate an ethyl group which can start another growth cycle. The thermal decomposition is much slower than reaction of ethylene with a hydride and, therefore, is the rate-determining step for the over-all reaction.

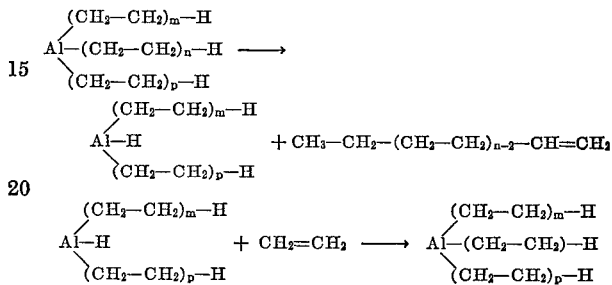

The growth and displacement reactions occured repeatedly as long as there is unreacted ethylene present. Therefore the reaction is advantageously afforded a very high residence time. As long as there is free ethylene in the presence of catalyst in the reactor under reaction conditions, each mole of catalyst present will produce additional normal alpha-olefin product. Therefore, a long residence time is conductive to a high alpha olefin yield per mole of catalyst, i.e., a high catalyst efficiency.

The third reaction is similar to the first except that the aluminum alkyl adds a product alpha olefin, rather than ethylene, to form a branched chain aluminum alkyl group. However, this structure is very unstable and rapidly decomposes to form a hydride and an olefin of vinylidene structure.

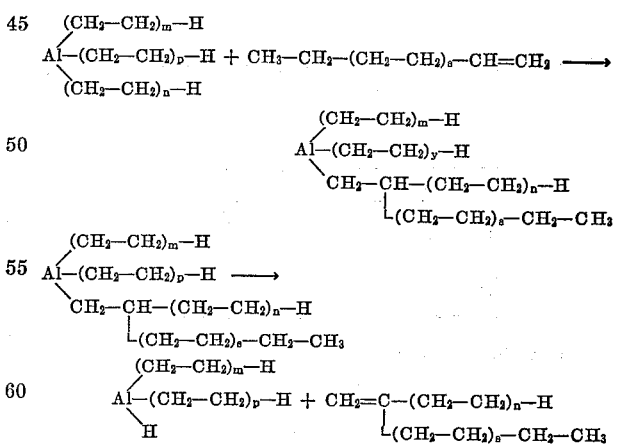

The decomposition is so rapid compared to the addition of another ethylene molecule to the branched alkyl that essentially all reactions of this type result in an olefin of vinylidene structure and regeneration of an aluminum ethyl alkyl group. As a result, there will be few, if any, alpha olefins with branching beyond the beta carbon.

Low temperature favors the growth reaction and will result in a higher average molecular weight product. At high temperatures, the average molecular weight will be lower because the transalkylation reaction predominates. The proportion of $C_{12}$ alpha olefin in the product tends to remain relatively constant with temperature changes within the most preferred range of this invention, with lower temperatures favoring a relatively higher proportion of product above $C_{12}$ and higher temperatures favoring a relatively higher proportion of product below $C_{12}$.

It is believed that the higher molecular weight alpha olefins produced at temperatures below reaction temperatures may be precursors to solid polymers which deposit on the walls of reactor, thus interfering with the removal of the exothermic heat of reaction. Therefore, in performing the process of the present invention cold ethylene charge is preheated substantially to full reaction temperature, i.e., to within about 5° F. or 10° F. of reaction temperature, prior to addition of catalyst thereto and commencement of the reaction. For example, when the reaction is performed continuously in a tubular reactor surrounded by a heat exchange medium, cold ethylene is charged to the inlet end of the tube and permitted to become preheated. The catalyst is injected into the tube at the downstream position therein at which ethylene has substantially reached full reaction temperature. In this manner, production of relatively high molecular weight alpha olefins is avoided.

In view of the fact that the production of normal alpha olefins is the object of the above reactions, ethylene is the sole olefin which can be employed in the charge. The normal alpha olefins produced will have from four to about 40 carbon atoms and will be primarily liquid with practically no solid polymer produced except as an undesired by-product. The normal alpha olefins produced, particularly the $C_{12}$, $C_{14}$ and $C_{16}$ alpha olefins, have high utility for the production of detergents.

The catalyst employed in the alpha olefin process can be defined by the following structural formula: $AlR_3$, wherein R is an alkyl group having from two to 40 carbon atoms, or even higher. One or two of said R's can be hydrogen. In the latter case one or both of the alkyls can have from one to 40 carbon atoms. Examples of catalysts which can be employed include $HAl(CH_3)_2$, $Al(C_2H_5)_3$, $Al(C_3H_7)_3$, $Al(C_4H_9)_3$, etc. Mixtures of these catalysts can also be used. A preferred catalyst is an aluminum alkyl, such as triethylaluminum. The catalyst can be used as such, but preferably is employed with about 70 to 99 percent by weight thereof of a solvent which heretofore has been limited to paraffins, cycloparaffins, aromatic hydrocarbons or relatively high molecular weight olefins ($C_{18}$ or higher). Examples of prior art solvents include n-heptane, isooctane, cyclohexane, benzene, xylene and alpha olefin recycle streams of the present process comprising the $C_{18}$ or $C_{29}$ and higher alpha olefin products. The present invention involves the use of diisobutylene as the catalyst solvent. Since it is desired to produce a liquid alpha olefin product rather than a relatively high molecular weight solid polymer, the catalyst should be substantially free of catalyst components, such as, for example, $TiCl_4$, which tend to cause production of relatively high molecular weight solid polymers. The amount of catalyst required herein is not critical and can be from about $1 \times 10^{-4}$ to about $1 \times 10^{-2}$ moles per mole of ethylene.

The temperature of the reaction can range from about 285° F. to about 615° F., generally, from about 350° F. to about 430° F., preferably, and from about 380° F. to about 400° F., most preferably. The upper range of pressure employed is not critical and can be as high as about 1000 atmospheres or even higher, but the lower pressure range, however, is critical. The pressure should be sufficiently high that most of the alpha-olefin product is a liquid under reaction conditions and so that the catalyst and most of the ethylene are dissolved or dispersed in said liquid. As soon as the liquid alpha olefin product is produced, the catalyst tends to entirely dissolve therein. It is important to have as high as possible a concentration of ethylene in the phase containing the catalyst, otherwise olefin product rather than ethylene will tend to react with the catalyst to produce vinylidenes. Therefore, the pressure should be sufficiently high to force as much ethylene as possible into the liquid phase together with the catalyst.

After there has been a conversion of 55 to 60 percent of the ethylene, there is sufficient liquid product to dissolve substantially all the ethylene and produce a single homogeneous phase in the reactor. Thus, the pressure in the reactor must at all times be at least about 1000, and preferably within the 2000 to 4000 pounds per square inch range, and can even be higher.

When it is desired to terminate the reaction, the product is withdrawn from the tubular reactor and is reduced in temperature and pressure, whereupon most of the gaseous olefins are flashed off. The liquid product is then treated in any suitable manner to deactivate the catalyst and the desired product fractions are recovered. The catalyst may be deactivated, for example, by contact with sufficient acid, base, water or alcohol to react stoichiometrically with the catalyst. When an acid or base is employed an aqueous layer is formed, which is then separated from the organic layer, and the remainder, including the solvent for the catalyst, can be separated into its component parts by distillation. If desired, the catalyst can be deactivated by contact with oxygen or halogens or any other material which reacts with and suitably destroys the catalytic activity of organometallic compounds. In a preferred method the aluminum catalyst is removed from the alpha-olefin product by reaction with caustic solution to form $Na_2OAl_2O_3$ plus paraffin as follows:

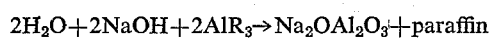

$$2H_2O + 2NaOH + 2AlR_3 \rightarrow Na_2OAl_2O_3 + paraffin$$

It is shown in Ser. No. 153,815, filed Nov. 21, 1961, abandoned and refiled under Ser. No. 608,127 on Jan. 9, 1967, now Pat. No. 3,482,000, that the amount of the desired normal alpha-olefin in the product is always greater when the polymerization reaction is carried out in a tubular or coil reactor rather than in a single continuous stirred autoclave or series of stirred autoclaves for a given total conversion of ethylene to some kind of polymer. That application explains that in order to achieve high selectivity toward normal alpha olefins the reactants and product should flow substantially as a column through the tube whereby there is a minimum of backmixing so that the percentage of normal alpha-olefin product increases throughout the length of the reactor. Since a given molecule of aluminum alkyl catalyst can undergo growth and transalkylation reactions repeatedly, it is important that ethylene charge and catalyst be permitted a high residence time in order to achieve a high catalyst efficiency, i.e., the production of a large amount of normal alpha olefins per mole of aluminum alkyl catalyst charged. A high residence time and avoidance of backmixing is most conveniently achieved by utilizing a very long tubular reactor.

Temperature control is an important consideration in a very long tubular reactor. The molecular weight distribution of the normal alpha-olefin product, in addition to rate of conversion, is determined by the temperature of the reaction and it is therefore important to maintain substantially a constant temperature at every point along the length of the reactor tube. If the tube length is very great, it is apparent that concurrent or counter-current flow of a coolant along the length of the tube on the outside thereof will produce a temperature gradient in the cooling fluid and, therefore, also in the reactor tube. To overcome this disadvantage, the reactor tubes are advantageously submerged in a bath of a pressurized boiling liquid, such as water, whereby a constant temperature is maintained throughout the entire body of cooling fluid. A change in the pressure exerted on the boiling liquid produces a rapid change in temperature at every point throughout the liquid bath, especially because of the agitation provided in the bath because of the boiling of the coolant.

During the above-described conversion of ethylene to liquid normal alpha olefins having from about 4 to 30 or 40 carbon atoms, a small but highly deleterious quantity of solid polymer is formed. The polymer deposits on reactor surfaces, interfering with heat transfer so that the reactor must be periodically shut down for removal of said polymer. Furthermore, polymer which is formed and which does not adhere to reactor surfaces is carried out of the reactor in the effluent stream and can be removed by filtration to avoid fouling surfaces of equipment downstream from the reactor, such as heat exchangers and distillation columns.

We have now discovered that the catalyst and reactor efficiencies of the above-described ethylene conversion process can be improved without the formation of additional solid polymer by performing the ethylene conversion in the presence of diisobutylene. The increased catalyst and reactor efficiencies resulting from the use of diisobutylene, as opposed to n-heptane for example, permit economical reactor designs and sizes and also make the economical production of low saturates level alpha olefins more feasible. In addition, diisobutylene, which boils between $C_6$ and $C_8$ alpha-olefins, is more easily separable from the desired alpha olefin products than the higher molecular weight solvents disclosed in the prior art.

The amount of diisobutylene employed in this invention as the solvent for the organometallic catalyst can vary from about 70 to about 99 percent by weight based on the weight of catalyst solution, and preferably from about 85 to 95 percent. Based on the weight of total charge to the reactor, the amount of solvent can range from about 0.2 to 30 percent, preferably from about two to about 15 percent.

It is a feature of this invention that the catalyst and diisobutylene not be added to the tubular reactor together with the ethylene, which is relatively cold, but rather that the ethylene charge be added separately to the inlet end of a tubular reactor immersed in a heat exchange medium so that said cold ethylene becomes preheated nearly to full reactor temperature before catalyst and solvent is added. The catalyst and solvent are then injected into the tubular reactor at the downstream position closest to the inlet end of the reactor whereat the temperature of the ethylene has just about reached the reaction temperature. If the catalyst and solvent were added to the reactor together with the ethylene, the solvent would have a tendency to encourage a high reaction rate at a relatively cold temperature which is below the control reaction temperature because of the presence of nonpreheated ethylene. Moreover, the solvent itself helps to dissipate the heat of the reaction. Increasing the rate of the reaction at a temperature below the desired reaction temperature would be severly disadvantageous because the temperature of the reaction determines the carbon number distribution in the normal alpha-olefin product and relatively low reaction temperatures encourage production of undesirable components of the product. The carbon number of the product components is a highly important consideration because the $C_{12}$, $C_{14}$, and $C_{16}$ alpha olefins are the most desirable components of the product, being useful for the production of detergents, while the $C_{22}$ and higher molecular weight alpha olefins are the least desirable components of the product.

Since lower reaction temperatures would favor the production of $C_{22+}$ product, it will be appreciated that if the catalyst and solvent were added to cold ethylene, the sole contribution of the solvent would be to enhance the efficiency of the reactor for the production of an undesirable product. Therefore, if catalyst were added directly to cold ethylene, it would be more advantageous to omit use of a solvent of the present invention. On the other hand, if the ethylene is added separately to one end of the reactor tube and permitted to become preheated prior to addition of catalyst and solvent which are introduced at a downstream position in the reactor coil whereat the ethylene has been just about preheated to reaction temperature, the solvent will function to enhance the efficiency of the reactor for the production of the most desirable alpha-olefin products of the process.

Generally, in accordance with the present invention a product containing from about 10 to 20 percent material in the $C_{20+}$ molecular weight range is obtained. At ambient conditions, these high molecular weight materials are solids, but under reaction conditions, for example at about 350°–430° F., all but a very small amount of the higher molecular weight materials will be liquid. Thus, it is only this very small amount of undesired solid polymer which may tend to foul walls of the reactor tubes. In the process of the present invention wherein a predominantly liquid rather than a solid product is produced, the solvent functions by increasing the initial rate of production of preferred alpha olefins, i.e., in furthering the reaction during its early stages before a quantity of alpha-olefin product has been produced substantially equal to the quantity of solvent added with the catalyst. This function of the solvent is sharply contrasted to the function of a solvent in processes which use organometallic catalysts together with cocatalysts such as $TiCl_4$ to produce a product having a much higher molecular weight than the product of the present process and which are solid rather than liquid, i.e., have a molecular weight from about 2,000 to 1,000,000 or 2,000,000. The primary function of a solvent in such process is to form a slurry with the solid polymer product and to facilitate its removal from the reactor. In performing this function the solvent exerts its primary effect after the product is produced, rather than before production of any substantial amount of product as is the case in the method of the present invention.

In the production of high molecular weight solid polymers, a relatively large quantity of solvent is required to form a slurry of the solid product. In contrast, it is a critical feature of the present invention that only a relatively small amount of solvent be employed. In the performance of the present invention in a tubular reactor, as described above, a highly beneficial effect is achieved when a small quantity of solvent is employed while an increase in the quantity of solvent utilized above the critical value of this invention causes the solvent to actually exert a detrimental effect upon the process. The presence of a relatively small amount of solvent, said amount being within the range of the present invention encourages formation of a homogeneous liquid phase containing substantially all the catalyst and a substantial quantity of dissolved ethylene in which the reaction can proceed. As liquid product is formed it is miscible with and is incorporated into the homogeneous liquid phase, providing an enlarged liquid phase into which still more ethylene can dissolve to be in close proximity to the catalyst and thereby participate in the reaction.

The reason that a relatively small quantity of solvent should be employed is to enable the solvent to assist in initiating the reaction without consuming an excessive amount of reactor volume to excessively reduce the residence time of the catalyst and ethylene in the reactor. As noted above, each molecule of organometallic catalyst reacts repeatedly with unreacted ethylene as long as said catalyst remains in the reactor. If the amount of solvent employed is increased above the range of this invention, it consumes an excessive amount of reactor volume causing residence time to decrease excessively. An excessive decrease in residence time limits the extent of the reaction and thereby negates any advantage otherwise achievable by the use of a solvent.

When the solvent of this invention, that is, diisobutylene, is added to the reactor in small quantities, an increase in reactor efficiency begins to appear. As the amount of solvent is increased, the increase in reactor efficiency continues until a maximum is achieved. Thereupon, use of a quantity of solvent above the range of this invention imparts a decrease in reactor efficiency, because loss of residence time within the reactor becomes the controlling feature. Therefore, it is desirable that the amount of solvent employed is not more than about 30 percent by weight of the total charge to the process, and that the amount of solvent in the total charge is between about 0.2 and 30 percent by weight, generally, and between about 2 and 15 percent by weight, preferably.

A series of test runs were performed to show the advantageous effect of the solvent of this invention. These runs were performed in a coil immersed in pressurized boiling water employing ethylene as the reactant and triethylaluminum as the catalyst. The catalyst was introduced into the coil reactor in solution in the solvents being compared. The solvents used for testing and comparison included diisobutylene and n-heptane. The reaction pressure, temperature, feed rate of ethylene, and conversion level were maintained constant throughout the continuous test period which extended over several days. Frequent measurements were made of the amount of alpha olefins produced and the conversion level so that correctional adjustments could be made if required. The conversion level was monitored by continuously measuring the volume of off gas (consisting of the unreacted ethylene, most of the butene product and small amounts of the other lighter olefin products) and by frequently analyzing the off gas by chromatography. In the case of diisobutylene, the catalyst and reactor efficiencies steadily improved as the onstream time of the run became longer, and it was necessary to adjust the rate of the catalyst feed to the reactor to lower and lower levels in order to maintain the conversion level at the desired value. In contrast, when normal heptane was used as the catalyst solvent over a continuous and extended reaction period and the reaction temperature and pressure and ethylene feed rate were maintained constant, the reactor and catalyst efficiencies were constant. Thus, no changes had to be made in the rate at which the fresh catalyst solution was fed to the reactor in order to maintain the same conversion level. In these test runs, sufficient catalyst solutions were prepared at the onset so that the necessary catalyst was furnished from the same supply. The above-described test runs will be more fully appreciated by reference to the following illustrative examples.

EXAMPLE 1

In this example, diisobutylene was employed as the catalyst solvent. The reactor coil was 256 feet long and 0.546 inch in internal diameter (Schedule 80, carbon steel) to provide a total volume of 0.4167 cubic feet. Ethylene was added at one end of the coil and permitted to become preheated to reaction temperature prior to injection of the triethylaluminum catalyst at an intermediate position along the reactor coil. The water bath temperature was maintained at 395° F., while the reaction pressure was 3400 pounds per square inch gauge. Ethylene was fed to the reactor at the rate of 157 Standard cubic feet per hour (equivalent to 12.24 pounds per hour). Enough of the catalyst solution, which contained 6.0% by weight of triethylaluminum in diisobutylene as the solvent, was added to achieve a conversion of 65% of the feed ethylene to alpha olefin product. The catalyst was not fed at a constant rate since the catalyst and reactor efficiencies continually improved as the run progressed. Thus, the rate of catalyst feed had to be reduced at frequent intervals. For example, during the first 24 hours of operation, the average hourly catalyst feed rate was 0.060 pound of triethylaluminum per hour, during the fourth 24-hour period the average hourly rate was 0.049 pound of triethylaluminum, during the seventh 24-hour period the catalyst feed rate had steadily decreased to 0.0385 pound of triethylaluminum per hour and during the final or ninth 24-hour period the rate had decreased to 0.0365 pound per hour. As the run progressed the volume of the off gas from the reactor effluent was continuously measured and its composition was analytically determined by chromatography. This information, coupled with the amount of ethylene fed to the reactor, was used to calculate conversion levels and catalyst and reactor efficiencies. At the end of the each 24-hour period, a determination was made of the total amount of olefin product which had accumulated during this period. The data obtained from such determinations may be used as another basis for determining conversion levels, reactor and catalyst efficiencies and product quality. The pertinent data collected during the test period in which diisobutylene was used as the catalyst solvent are given in Table I.

EXAMPLE 2

In this example, a catalyst solution containing 4.0% (by weight) of triethylaluminum dissolved in Reference Fuel Grade n-heptane as the solvent was used. The reactor used in this example consisted of 364 feet of 0.423 inch inside diameter tubing and 540 feet of 0.24 inch tubing connected in series. The total volume of the reactor was 0.5385 cubic feet. The water bath temperature was maintained at 395° F., and the reactor pressure was maintained at 4000 pounds per square inch gauge. Ethylene was fed to the tubular reactor at the rate of 194 standard cubic feet per hour or 15.19 pounds per hour and sufficient catalyst solution (4.0 weight percent triethylaluminum in n-heptane) was added to achieve a conversion of 68–70 percent of the feed ethylene to olefin products. As in Example 1, the volume of the off gas from the reactor effluent was continuously measured and its composition chromatographically determined so that the reactor could be maintained at the desired conversion level. At the end of each 24-hour onstream period, without interrupting the run, the total amount of product produced during this period was measured, thus giving an alternative way of calculating conversion level. The quality of the product could also be determined by processing a sample of the liquid product. Since the catalyst and reactor efficiencies remained essentially constant throughout the duration of this run, no adjustments had to be made in the fresh catalyst feed rate to keep the extent of conversion at the desired level. This situation is quite different from that experienced when diisobutylene was used as the catalyst solvent. The data below illustrate the invariance in the catalyst rate as the run progressed.

| Twenty-four hour run period: | Triethylaluminum feed rate, lbs. per hr. |
| --- | --- |
| 1st | 0.08615 |
| 3rd | 0.08632 |
| 4th | 0.08649 |
| 6th | 0.07965 |
| 8th | 0.0874 |
| 9th | 0.08756 |

The data showing the comparison of the catalyst and reactor efficiencies and the important reaction conditions for Examples 1 and 2 are set forth in Table I. In this regard, it should be noted that the small difference in the reaction variables, such as conversion levels of 65% versus 68–70% and pressures of 3500 pounds per square inch gauge versus 4000 pounds per square inch gauge have no significant effect on the parameters under investigation.

TABLE I

| Solvent | Period No.[1] | Reactor bath temperature, °F. | Reaction pressure, p.s.i.g. | Catalyst efficiency [2] | Reactor efficiency [3] |
|---|---|---|---|---|---|
| n-Heptane (reference fuel grade) | 1 | 395 | 4,000 | 123.7 | 64.7 |
|  | 2 | 395 | 4,000 | 128.4 | 65.7 |
|  | 3 | 395 | 4,000 | 123.1 | 65.6 |
|  | 4 | 395 | 4,000 | 121.6 | 62.9 |
|  | 5 | 395 | 4,000 | 130.7 | 65.2 |
|  | 6 | 395 | 4,000 | 136.0 | 71.7 |
|  | 7 | 395 | 4,000 | 125.7 | 66.3 |
|  | 8 | 395 | 4,000 | 123.6 | 65.7 |
|  | 9 | 395 | 4,000 | 117.8 | 59.4 |
| Diisobutylene | 1 | 395 | 3,400 | 130.4 | 69.0 |
|  | 2 | 395 | 3,400 | 140.4 | 74.6 |
|  | 3 | 395 | 3,400 | 147.1 | 77.7 |
|  | 4 | 395 | 3,400 | 167.4 | 89.5 |
|  | 5 | 395 | 3,400 | 183.8 | 95.9 |
|  | 6 | 395 | 3,400 | 196.2 | 103.2 |
|  | 7 | 395 | 3,400 | 201.5 | 105.3 |
|  | 8 | 395 | 3,400 | 183.5 | 95.8 |
|  | 9 | 395 | 3,400 | 224.3 | 104.4 |

[1] Each period represents a 24-hour test period. Thus, data for Number 1 represent data collected after 24 hours, while data for period No. 6 were collected after 144 hours of onstream time.
[2] Grams of ethylene converted per gram of catalyst.
[3] Grams of ethylene converted per hour per milliliter of reactor volume per weight fraction of catalyst in reactor feed.

As show in Table I, the catalyst efficiency steadily increased from 130.4 to 224.3 grams of ethylene converted per gram of catalyst when diisobutylene was employed as the catalyst solvent for a period of 9 days. Similarly, the reactor efficiency increased from 69.0 to 104.4 grams of ethylene converted per hour per milliliter of reactor volume per weight fraction of catalyst in the reactor feed.

On the contrary, when n-heptane was employed as the catalyst solvent, both the catalyst and reactor efficiencies were lower at the end of 9 days than they were at the end of the first day of operation. Thus, while the reactor efficiency increased about 51 percent after 6 days onstream, and about 72 percent after 9 days when diisobutylene was employed as the catalyst solvent, the reactor efficiency increased only about 10 percent after 6 days onstream when n-heptane was employed as the solvent. After 9 days onstream with n-heptane as the solvent, the reactor efficiency was actually about 5 percent lower than after 1 day onstream.

Similarly, the catalyst efficiency increased about 50 percent after 6 days onstream, and about 51 percent after 9 days onstream when diisobutylene was employed as the solvent whereas the catalyst efficiency increased only about 10 percent after 6 days onstream using n-heptane. After about 6 days onstream using n-heptane, the catalyst efficiency, just as did the reactor efficiency, began to deteriorate such that after 9 days onstream, the catalyst efficiency was actually about 8 percent lower that is was after 1 day onstream.

When comparing the reactor and catalyst efficiencies for both 1 day and 9 days onstream, it is evident that diisobutylene is a more desidable solvent than n-heptane. Thus, after 1 day onstream, the reactor efficiency is about 5 percent higher and the catalyst efficiency is about 6 percent higher when diisobutylene is the solvent. After 9 days onstream the reactor efficiency is about 90 percent higher and the catalyst efficiency is about 76 percent higher when diisobutylene, as opposed to n-heptane, is employed as the solvent.

The accompanying figure shows a tubular reactor system for the practice of this invention wherein ethylene is charged to a very long tubular reactor 10 through a flow control valve 12. Tubular reactor 10 is disposed substantially entirely within outer shell 14. Cooling water is charged to shell 14 through line 16. Level control valve 18 maintains a constant water level 20 within the shell which completely submerges reactor 10. A relatively small stream of alkylaluminum catalyst, such as triethyl-aluminum, dissolved in the solvent of this invention is pumped by positive displacement action to an intermediate point 22 in coil 10 through line 32 and valve 34 so that the region 24 of said coil upstream from point 22 serves as an ethylene preheat zone and the region 26 of said coil downstream from point 22 serves as a reaction zone. Point 22 is essentially the point in said reactor coil closest to the inlet end wherein the ethylene is substantially effectively preheated to the reaction temperature. Thereafter, regulation of steam pressure within shell 14 by means of steam pressure control valve 28 in line 30 establishes the temperature of the boiling water throughout shell 14 and maintains a uniform reactor temperature substantially throughout the length of reaction zone 26 of the coil 10. Reaction zone effluent comprising predominantly normal alpha olefins, unreacter ethylene, catalyst, and catalyst solvent is discharged through reactor pressure control valve 36, whereat the pressure is reduced to between about 50 and 1,000 pounds per square inch gauge, and is then discharged through cooling chamber 38 whereat product temperature is reduced to the lowest practical temperature while still maintaining the product in a liquid state, i.e., to about 140°–150° F., by means of water charged through line 40 and removed through line 42. Finally, product which is cooled and at a reduced pressure is passed through line 44 and a product measuring device 46, such as a flow recorder or chromatograph, depending upon the type of measurement desired for the process, and is then discharged through line 48 to a caustic treatment chamber, not shown, for removing the catalyst from the desired normal alpha olefin product by reacting the catalyst with caustic to produce sodium aluminate and paraffins.

In order to achieve the highest conversion of ethylene to normal alpha olefin per mole of catalyst used the length of the reactor is made as long as possible and is only limited by practical and economic size restrictions of outer shell 14, and by pressure drop. For example, tube 10 can comprise between about 500 and 10,000 feet of about one- to four-inch pipe. There are a number of reasons for utilizing a very long tubular reactor. First, a very long tubular reactor permits excellent heat transfer for removal of heat of reaction. Secondly, it advantageously reduces backmixing for the reason explained above. Thirdly, a long reactor length permits achievement of a high catalyst efficiency because of additional conversion per mole of catalyst. Finally, a long reactor length tends to minimize the percentage of paraffin in the alpha-olefin product. The final reason is based upon the fact that upon separation of the alkyl aluminum catalyst by treatment with caustic the alkyl components of the catalyst are converted to paraffins which have boiling points close to those of the most desired alpha-olefin components of the product and are therefore difficult to remove from the desired normal alpha olefins.

Since the absolute amount of paraffins produced is fixed by the quantity of catalyst used, the greater the quantity of alpha olefins produced with said catalyst the smaller will be the percentage of paraffins in the product.

The steam pressure in shell 14 is maintained at about between 50 and 500 pounds per square inch, generally, and at about between 140 and 340 pounds per square inch, preferably. The reactants in reaction zone 26 are generally at the temperature only about 3° F. to 25° F. above the bath temperature. The reaction temperature not only affects the degree of conversion of ethylene but it also establishes the molecular weight distribution of the alpha-olefin product. Since relatively low reaction temperatures favor conversion to relatively high molecular weight product it is important to preheat the ethylene within about 1° F. to 30° F., generally, and 3° F. to 10° F., preferably, of the coolant bath temperature prior to addition of catalyst and solvent. It is believed that the relatively high molecular weight alpha olefins produced at low reaction temperatures grow into polymers which can foul the downstream region of the reactor tube and thereby increase the frequency of periodic reactor down times due to fouling because of polymer formation. It is therefore important not to add catalyst and solvent to the reactor tube until the ethylene has been preheated to as near as possible to reaction temperature, and preferably at least to within about 10° F. of reaction temperature.

Finally, the reactor tube should not be so long that more than about 75 weight percent, generally, or more than about 60 weight percent, preferably, of the ethylene is converted to product. The reason is that at high conversion levels, there arises excessive competition between olefin product and ethylene in the growth reaction, whereby conversion to vinylidene compounds becomes excessive.

The invention being thus described, it will be obvious that various changes and modifications can be made without departing from the spirit and scope thereof.

We claim:

1. A catalytic process for the production of normally liquid alpha olefins from ethylene under reaction conditions of temperature and pressure comprising preheating an ethylene charge substantially to reaction temperature, charging trialkyl aluminum catalyst dissolved in diisobutylene to said preheated ethylene, the amount of said solvent in the total reactor charge being between about 0.2 to 30 percent by weight.

2. The process of claim 1 wherein the catalyst is triethylaluminum.

3. The process of claim 1 wherein the catalyst is triisobutylaluminum.

4. The process of claim 1 wherein the amount of said solvent in the reactor charge is between about 2 and 15 percent by weight.

5. A process for producing liquid alpha olefins containing primarily between about 4 and 40 carbon atoms comprising charging ethylene through a metallic tubular reactor, said reactor being immersed in a bath of pressurized water with the inlet end of said tubular reactor being a preheat zone and a reaction zone being at an intermediate position in said tubular reactor, preheating said ethylene in said preheat zone to within about 10° F. of reaction temperature, charging at said intermediate position in said tubular reactor a trialkyl aluminum catalyst, said catalyst being dissolved in from about 0.2 to 30 percent diisobutylene based on the total weight of charge and being substantially free of $TiCl_4$ or other components tending to cause production of solid polymers, maintaining said reaction zone at a reaction temperature between about 285° F. and 615° F. and a pressure of at least about 1,000 pounds per square inch, and withdrawing an effluent stream containing said alpha olefins from said tubular reactor.

References Cited
UNITED STATES PATENTS

| | | | |
|---|---|---|---|
| 2,699,457 | 1/1955 | Ziegler et al. | 260—683.15 |
| 3,310,600 | 3/1967 | Ziegler et al. | 260—683.15 |
| 3,482,000 | 12/1969 | Fernald et al. | 260—683.15 |
| 3,510,539 | 5/1970 | Fernald et al. | 260—683.15 |

PAUL M. COUGHLAN, JR., Primary Examiner

UNITED STATES PATENT OFFICE
CERTIFICATE OF CORRECTION

Patent No. 3,655,809    Dated April 11, 1972

Inventor(s) Herbert B. Fernald, William Gall, Bernard H. Gwynn and John V. Ward

It is certified that error appears in the above-identified patent and that said Letters Patent are hereby corrected as shown below:

Column 2, line 50, should read $$\text{"Al-(CH}_2\text{-CH}_2)_p\text{-H"}$$

Column 3, line 61,  "$C_{29}$" should read "$C_{20}$".

Column 9, line 54, "that is" should read "than it".

Column 9, line 57, "desidable" should read "desirable".

Signed and sealed this 3rd day of October 1972.

(SEAL)
Attest:

EDWARD M. FLETCHER, JR.
Attesting Officer

ROBERT GOTTSCHALK
Commissioner of Patents